(12) United States Patent
Sawanishi et al.

(10) Patent No.: US 10,835,986 B2
(45) Date of Patent: Nov. 17, 2020

(54) RESISTANCE SPOT WELDING METHOD AND WELDED MEMBER PRODUCTION METHOD

(71) Applicant: JFE Steel Corporation, Tokyo (JP)

(72) Inventors: Chikaumi Sawanishi, Tokyo (JP); Koichi Taniguchi, Tokyo (JP); Katsutoshi Takashima, Tokyo (JP); Hiroshi Matsuda, Tokyo (JP); Rinsei Ikeda, Tokyo (JP)

(73) Assignee: JFE Steel Corporation, Tokyo (JP)

(*) Notice: Subject to any disclaimer, the term of this patent is extended or adjusted under 35 U.S.C. 154(b) by 374 days.

(21) Appl. No.: 15/755,118

(22) PCT Filed: Aug. 23, 2016

(86) PCT No.: PCT/JP2016/003811
§ 371 (c)(1),
(2) Date: Feb. 26, 2018

(87) PCT Pub. No.: WO2017/033455
PCT Pub. Date: Mar. 2, 2017

(65) Prior Publication Data
US 2018/0257165 A1 Sep. 13, 2018

(30) Foreign Application Priority Data
Aug. 27, 2015 (JP) .................. 2015-167935

(51) Int. Cl.
*B23K 11/11* (2006.01)
*B23K 11/16* (2006.01)
*B23K 103/04* (2006.01)

(52) U.S. Cl.
CPC ............ *B23K 11/11* (2013.01); *B23K 11/115* (2013.01); *B23K 11/16* (2013.01); *B23K 11/163* (2013.01); *B23K 2103/04* (2018.08)

(58) Field of Classification Search
CPC ...... B23K 11/11; B23K 11/115; B23K 11/163; B23K 2103/04
See application file for complete search history.

(56) References Cited

U.S. PATENT DOCUMENTS 6,232,572 B1 * 5/2001 Kanjo ............... B23K 11/115
219/110
8,076,604 B2 * 12/2011 Rippl ............... B23K 11/115
219/91.2

(Continued)

FOREIGN PATENT DOCUMENTS

EP 2965848 A1 1/2016
EP 3006154 A1 4/2016

(Continued)

OTHER PUBLICATIONS

Office Action dated Feb. 14, 2019, of counterpart Korean Application No. 10-2018-7005582, along with a Concise Statement of Relevance of Office Action in English.

(Continued)

*Primary Examiner* — David P Angwin
*Assistant Examiner* — Nicholas A Ros
(74) *Attorney, Agent, or Firm* — DLA Piper LLP (US)

(57) ABSTRACT

A resistance spot welding method inhibits, in accordance with the electrode angle, the occurrence of cracking in the weld regardless of the steel grade. The resistance spot welding method satisfies relationships:

$2 \cdot A \cdot (t \cdot T/F)^{1/2} \leq H$ when $0 \leq A < 1$ $(3 \cdot A - 1) \cdot (t \cdot T/F)^{1/2} \leq H$ when $1 \leq A < 10$ $(A + 19) \cdot (t \cdot T/F)^{1/2} \leq H$ when $10 \leq A < 20$ where H (ms) is an electrode force retaining time after completion of current passage, A (degrees) is an electrode (Continued)

angle of the electrodes, t (mm) is a sheet thickness of a steel sheet having a largest sheet thickness among the steel sheets, T (MPa) is a tensile strength of a steel sheet having a highest tensile strength among the two or more steel sheets, and F (N) is the electrode force.

12 Claims, 4 Drawing Sheets

(56) References Cited

U.S. PATENT DOCUMENTS

| | | | |
|---|---|---|---|
| 2012/0141829 A1 | 6/2012 | Oikawa et al. | |
| 2013/0048613 A1* | 2/2013 | Sigler | B23K 11/185 |
| | | | 219/91.2 |
| 2015/0136742 A1* | 5/2015 | Morita | B23K 11/3009 |
| | | | 219/86.7 |

FOREIGN PATENT DOCUMENTS

| | | |
|---|---|---|
| JP | 06-099283 A | 4/1994 |
| JP | 10-195597 A | 7/1998 |
| JP | 2003-019571 A | 1/2003 |
| JP | 2003-103377 A | 4/2003 |
| JP | 2003-236676 A | 8/2003 |
| JP | 2006-218538 A | 8/2006 |
| JP | 2011-005544 A | 1/2011 |
| JP | 2011005544 * | 1/2011 ............. B23K 11/11 |
| JP | 2013-071124 A | 4/2013 |
| JP | 2014-188539 A | 10/2014 |
| WO | 2014/136507 A1 | 9/2014 |
| WO | 2014/196499 A1 | 12/2014 |
| WO | 2015/049998 A1 | 4/2015 |
| WO | WO2015049998 * | 4/2015 ............. B23K 11/11 |

OTHER PUBLICATIONS

Extended European Search Report dated Apr. 1, 2019, of counterpart European Application No. 16838805.6.
Office Action dated Jul. 3, 2019, of counterpart Chinese Application No. 201680049747.3, including a Search Report in English.
Office Action dated Mar. 17, 2020, of counterpart Chinese Application No. 201680049747.3, including a Search Report in English.

* cited by examiner

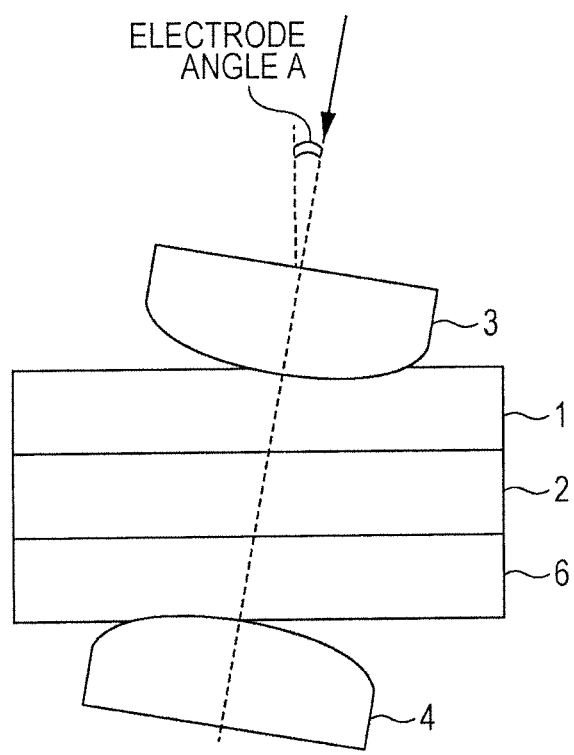

RESISTANCE SPOT WELDING METHOD AND WELDED MEMBER PRODUCTION METHOD

TECHNICAL FIELD

This disclosure relates to a resistance spot welding method and a welded member production method.

BACKGROUND

A resistance spot welding method is a type of lap resistance welding method and is typically used to join overlapping steel sheets together. In the welding method, as illustrated in FIG. 1, two or more overlapping steel sheets 1 and 2 are squeezed between a pair of electrodes 3 and 4 from above and below. While a force is applied to the steel sheets by the upper and lower electrodes, a high welding current is passed through the upper and lower electrodes for a short time to achieve joining. A spot weld 5 is obtained utilizing resistive heat generated by the passage of the high welding current. The spot weld 5 is referred to as a nugget and is a portion formed as follows. When current is applied to the overlapping steel sheets, the two steel sheets 1 and 2 melt at the region of contact between the steel sheets and solidify. In this manner, the steel sheets are joined together in the form of a spot.

However, in resistance spot welding, when two or more overlapping steel sheets of a sheet combination include a surface-treated steel sheet, there is a problem in that cracking may occur in the weld. As used herein, the surface-treated steel sheet refers to a steel sheet including a metal coating layer on the surface of the base material (base steel sheet). Examples of the metal coating include zinc coatings, which are typified by electrogalvanized coatings, galvanized coatings (including galvannealed coatings), and coatings of a zinc alloy containing, in addition to zinc, one or more elements such as aluminum and magnesium. Zinc coatings and zinc alloy coatings have melting points lower than the melting points of the base materials of the surface-treated steel sheets and therefore pose the following problem.

It is believed that cracking in the weld is attributable to so-called liquid metal embrittlement. Specifically, a metal coating layer, which has a low melting point, on the surface of the steel sheet melts during welding. When, for example, the force of the electrodes and tensile stress due to thermal expansion and contraction of the steel sheets are applied to the weld, the molten low melting point metal penetrates the grain boundaries of the base material of the surface-treated steel sheet to decrease the grain boundary strength, and this causes cracking. Cracking can occur in various locations, examples of which include, as illustrated in FIG. 1, one surface of the steel sheet 1, one surface of the steel sheet 2, the other surface of the steel sheet 1, and the other surface of the steel sheet 2. The one surface is the surface in contact with the electrode 3 or 4. The other surfaces are the surfaces in contact with each other.

To take measures against cracking, Japanese Unexamined Patent Application Publication No. 10-195597, for example, proposes that the steel sheets of the sheet combination have a composition having specific ranges. Specifically, the composition is made up of, in wt %, C: 0.003 to 0.01%, Mn: 0.05 to 0.5%, P: less than or equal to 0.02%, sol. Al: less than or equal to 0.1%, Ti: $48\times(N/14)$ to $48\times\{(N/14)+(S/32)\}$%, Nb: $93\times(C/12)$ to 0.1%, B: 0.0005 to 0.003%, N: less than or equal to 0.01%, and Ni: less than or equal to 0.05%, with the balance being Fe and incidental impurities.

Japanese Unexamined Patent Application Publication No. 2003-103377 2 proposes a method of spot welding a coated high strength steel sheet. In the method of spot welding a coated high strength steel sheet, the spot welding is performed with the welding time and the retaining time after current passage being set to satisfy conditions (1) and (2), $$0.25\cdot(10\cdot t+2)/50 \leq WT \leq 0.50\cdot(10\cdot t+2)/50 \quad (1)$$

$$300-500\cdot t+250\cdot t^2 \leq HT \quad (2)$$

where t: sheet thickness (mm), WT: welding time (ms), and HT: retaining time (ms) after current passage.

JP '377 also proposes performing welding by appropriately setting the welding time and the electrode retaining time after current passage in accordance with the sheet thickness of the steel sheet and using a high tensile zinc-coated steel sheet in which the contents of alloying elements are not greater than predetermined amounts.

Japanese Unexamined Patent Application Publication No. 2003-236676 proposes a method in which the current pattern is multi-step current passage including three or more steps, the welding conditions such as the welding time and the welding current are adjusted so that the appropriate current range ($\Delta I$: a current range that enables stable formation of a nugget having a nugget diameter greater than or equal to a desired diameter with the unmelted thickness being greater than or equal to 0.05 mm) can be greater than or equal to 1.0 kA, preferably greater than or equal to 2.0 kA, and a cooling time is provided between the steps.

However, JP '597 poses a problem in that, for example, since limitations need to be imposed on the contents of the alloying elements in the steel sheets, steel sheets that satisfy the required properties are limited. Thus, the application is extremely limited particularly because, currently, high-alloy steel sheets are increasingly being produced for increased strength.

JP '377 proposes a method of inhibiting cracking only when an excessively high welding current that can cause splashing is set, and does not make any reference to cracking that can occur in a state in which splashing does not occur.

JP '676 poses a problem in that optimization of the welding conditions requires many man-hours and the method cannot be applied to steel sheets and sheet combinations for which providing an appropriate current range is difficult. In addition, neither JP '377 nor JP '676 considers the influence of the angle of electrodes and, therefore, their measures are insufficient in some cases in view of actual operations in the assembly of automobiles.

It could therefore be helpful to provide a resistance spot welding method and a welded member production method that inhibit, in accordance with the angle of electrodes, the occurrence of cracking in the weld regardless of the steel grade.

SUMMARY

We thus provide:

[1] A resistance spot welding method of joining together two or more overlapping steel sheets of a sheet combination, the method including squeezing the sheet combination between a pair of electrodes and passing a current through the sheet combination while applying an electrode force thereto, in which at least one of the two or more steel sheets is a surface-treated steel sheet including a metal coating layer and the method satisfies the following relationships, $$2 \cdot A \cdot (t \cdot T/F)^{1/2} \leq H \text{ when } 0 \leq A < 1$$

$$(3 \cdot A - 1) \cdot (t \cdot T/F)^{1/2} \leq H \text{ when } 1 \leq A < 10$$

$$(A + 19) \cdot (t \cdot T/F)^{1/2} \leq H \text{ when } 10 \leq A < 20$$

where H (ms) is an electrode force retaining time after completion of current passage, A (degrees) is an electrode angle of the electrodes, t (mm) is a sheet thickness of a steel sheet having a largest sheet thickness among the two or more steel sheets, T (MPa) is a tensile strength of a steel sheet having a highest tensile strength among the two or more steel sheets, and F (N) is the electrode force.

[2] A resistance spot welding method that joins together two or more overlapping steel sheets of a sheet combination, the method including squeezing the sheet combination between a pair of electrodes and passing a current through the sheet combination while applying an electrode force thereto, in which at least one of the two or more steel sheets is a surface-treated steel sheet including a metal coating layer, the metal coating layer having a melting point lower than a melting point of a base material of the surface-treated steel sheet, and the method satisfies the following relationships, $$2 \cdot A \cdot (t \cdot T/F)^{1/2} \leq H \text{ when } 0 \leq A < 1$$

$$(3 \cdot A - 1) \cdot (t \cdot T/F)^{1/2} \leq H \text{ when } 1 \leq A < 10$$

$$(A + 19) \cdot (t \cdot T/F)^{1/2} \leq H \text{ when } 10 \leq A < 20$$

where H (ms) is an electrode force retaining time after completion of current passage, A (degrees) is an electrode angle of the electrodes, t (mm) is a sheet thickness of a steel sheet having a largest sheet thickness among the two or more steel sheets, T (MPa) is a tensile strength of a steel sheet having a highest tensile strength among the two or more steel sheets, and F (N) is the electrode force.

[3] The resistance spot welding method according to [1] or [2], in which A is greater than or equal to 0.2.

[4] The resistance spot welding method according to any one of [1] to [3], in which the metal coating layer is a Zn-based coating layer or an Al-based coating layer.

[5] The resistance spot welding method according to any one of [1] to [4], in which at least one of the two or more steel sheets has a tensile strength greater than or equal to 590 MPa.

[6] The resistance spot welding method according to any one of [1] to [5], in which, when there are one or more existing welds around a welding point, a distance L between a center of the welding point and a center of an existing weld closest to the welding point is set to greater than or equal to 6.0 mm to perform welding.

[7] A method of producing a welded member, the method including the steps of providing a sheet combination by arranging two or more steel sheets to overlap each other, at least one of the steel sheets being a surface-treated steel sheet including a metal coating layer; and welding the provided sheet combination using the resistance spot welding method according to any one of [1] to [6].

We provide a resistance spot welding method that inhibits the occurrence of cracking in the weld regardless of the steel grade. The use of the spot welding method enables production of a welded member having a weld with reduced cracking.

BRIEF DESCRIPTION OF THE DRAWINGS

FIG. 6 is a diagram illustrating a test method in examples in using a sheet combination of three overlapping sheets.

REFERENCE SIGNS LIST 1, 2, 6 Steel sheet
3, 4 Electrode
5 Weld (nugget)

DETAILED DESCRIPTION

Figure 1:
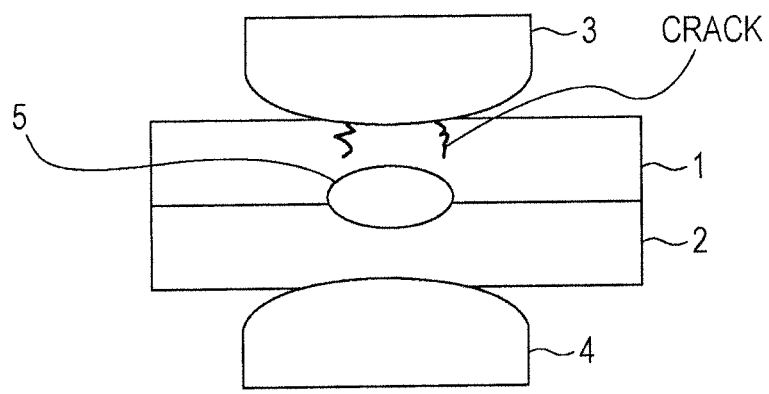
FIG. 1 is a diagram illustrating a resistance spot welding method.
Figure 2:
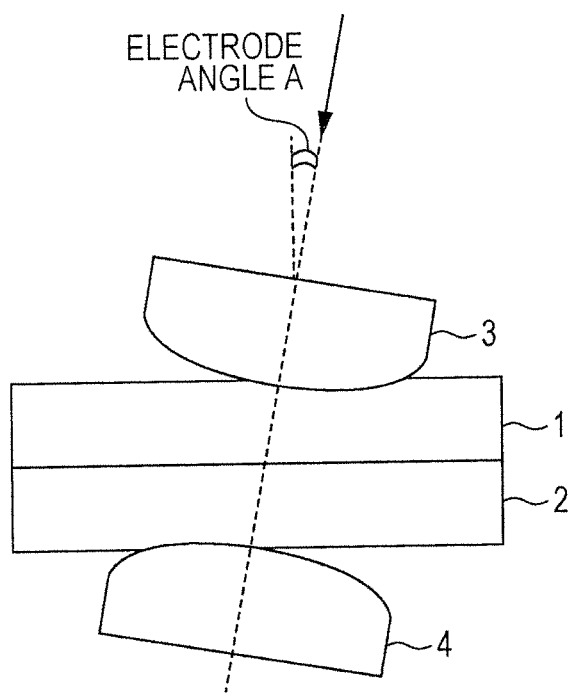
FIG. 2 is a diagram illustrating an electrode angle in the resistance spot welding method.

We found that cracking occurring during or after welding can occur even when the welding conditions are in the ranges in which splashing does not occur. We also found that, while the occurrence of cracking if affected by various factors, it is particularly significantly affected by an electrode angle A (degrees) for welding (inclination angle of electrodes with respect to steel sheets, FIG. 2). We further found that cracking can be inhibited by, in accordance with the magnitude of the electrode angle, appropriately adjusting the electrode force retaining time (hereinafter also referred to as holding time) after completion of current passage. As used herein, the electrode angle, as described above, refers to an inclination angle of the electrodes with respect to the steel sheets illustrated in FIG. 2, i.e., "the angle formed by the direction of the electrode force and the sheet thickness direction of the steel sheet." The direction of the electrode force is the direction indicated by an arrow in a drawing of spot welding illustrated in JIS Z 3001-6: 2013, 4.2.1. In FIG. 2 as well, the direction is indicated by an arrow.

The effects of methods against cracking that occurs during or after welding cannot be described simply because various factors exert influence in a complex manner. However, the basic mechanism is believed to be as follows. One cause of the occurrence of cracking in the weld is generation of tensile stress described below in a state in which the coating metal of the heated surface-treated steel sheet is in contact with the base material (base steel sheet) of the surface-treated steel sheet. The tensile stress locally increases in some regions when the electrodes are withdrawn away from the steel sheets after completion of welding.

During current passage, the weld 5 expands to cause compressive deformation of regions around the weld and, thereafter, solidification and shrinkage occur as a result of cooling after completion of the current passage. However, as long as the force is being applied by the electrodes 3 and 4, the stress is in a state of compression because of the restraint by the electrode force or, even if in a tensile state, the stress is alleviated. However, when released from the restraint by the electrode force, the tensile stress locally increases in some regions. We believe that cracking occurs in such regions.

Furthermore, cracking evaluation was conducted in a state in which there were various types of disturbance. As a result, we found that, when there is an electrode angle A (degrees), in particular when the electrode angle A (degrees) is large, the probability of cracking increases. Presumably, this is because, when there is an electrode angle, bending stress is applied to the weld and thus significant compressive plastic deformation is caused locally, and this leads to extremely high tensile stress after release of the electrodes. As discussed above, when tensile stress is applied to the weld, the molten low melting point metal penetrates the grain boundaries of the base material, and this decreases the grain boundary strength and causes cracking. Thus, we found that the occurrence of cracking can be reduced by appropriately decreasing, in accordance with the electrode angle, the temperature of the weld at the time when a high tensile stress is generated and thereby inhibiting the penetration of the low melting point metal into the grain boundaries of the steel sheet.

Our methods will be described in detail below.

We provide a resistance spot welding method that joins together two or more overlapping steel sheets of a sheet combination. The sheet combination is squeezed between a pair of electrodes and a current is passed through the sheet combination while an electrode force is applied thereto. The method includes a step of retaining the electrode force after completion of the current passage. Our resistance spot welding method applies to a sheet combination of two or more steel sheets at least one of which is a surface-treated steel sheet including a metal coating layer. It is preferable that the metal coating layer have a melting point lower than the melting point of the base material of the surface-treated steel sheet.

A welder usable in the resistance spot welding method may be a welder including a pair of upper and lower electrodes and in which the electrode force and the welding current can be individually controlled as desired during welding. With regard to the welder, there are no particular limitations on, for example, the force application mechanism (e.g., air cylinder or servo motor), the type (e.g., stationary or robot gun), and the shape of the electrodes. Examples of the type of the electrode tip include the dome radius type (DR type), the radius type (R type), and the dome type (D type), all specified in JIS C 9304: 1999. The tip diameter of the electrode ranges from 4 mm to 16 mm, for example.

Our method satisfies the following relationships, $$2 \cdot A \cdot (t \cdot T/F)^{1/2} \leq H \text{ when } 0 \leq A < 1$$

$$(3 \cdot A - 1) \cdot (t \cdot T/F)^{1/2} \leq H \text{ when } 1 \leq A < 10$$

$$(A+19) \cdot (t \cdot T/F)^{1/2} \leq H \text{ when } 10 \leq A < 20$$

where H (ms) is an electrode force retaining time after completion of current passage, A (degrees) is an electrode angle of the electrodes, t (mm) is a sheet thickness of a steel sheet having the largest sheet thickness among the two or more steel sheets, T (MPa) is a tensile strength of a steel sheet having a highest tensile strength among the two or more steel sheets, and F (N) is an electrode force. Furthermore, when the electrode angle A is specifically recited as being greater than or equal to 0.2 (degrees) in the above formulas, our method satisfies the following relationships, $$2 \cdot A \cdot (t \cdot T/F)^{1/2} \leq H \text{ when } 0.2 \leq A < 1$$

$$(3 \cdot A - 1) \cdot (t \cdot T/F)^{1/2} \leq H \text{ when } 1 \leq A < 10$$

$$(A+19) \cdot (t \cdot T/F)^{1/2} \leq H \text{ when } 10 \leq A < 20.$$

The holding time H is an electrode force retaining time after completion of current passage and is a period of time that lasts from the completion of current passage to the time at which the electrodes are released from the steel sheets. The time at which the electrodes are released from the steel sheets refers to the time at which the electrodes start to be separated from the steel sheets. The electrode force F is an electrode force at the completion of current passage. When current passage is performed more than once, the electrode force F is an electrode force at the completion of the final current passage. The electrode force during current passage may or may not be constant. The electrode angle A of the electrodes is an electrode angle at the start of current passage. The electrode force F in the step of retaining the electrode force after completion of current passage is a measured value.

Because of this configuration, when the electrode angle is greater than 0 degrees, e.g., when the electrode angle is greater than or equal to 0.2 degrees, at which cracking is more likely to occur during or after spot welding, the temperature of the weld at the occurrence of tensile stress is lowered. This prevents liquid metal embrittlement due to the metal coating layer (zinc, for example) of the surface-treated steel sheet. Specifically, the coating metal becomes molten temporarily when it is heated by the current passage for welding, but the holding time longer than or equal to a predetermined length is provided in accordance with the electrode angle to lower the temperature of the weld. As a result, by the time the subsequent tensile stress is generated (i.e., when the electrodes are released from the steel sheets), the coating metal will have solidified and thus the coating metal will not penetrate the grain boundaries. Consequently, the occurrence of cracking is reduced.

Spot welding is performed with the electrodes being water cooled constantly. Thus, when the holding time is extended, the cooling rate increases and, therefore, the temperature of the weld at the time the tensile stress is generated can be lowered. When the solidification of the metal coating layer alone is taken into account, a longer holding time may be preferred. However, the holding time need not be extended longer than necessary and, for example, the holding time may be set to a time period close to the lower limit that satisfies the formulas. This results in a resistance spot welding method that inhibits the occurrence of cracking and has good productivity. For example, the holding time H may be less than or equal to 30 ms.

As described above, when there is an electrode angle, bending stress is applied to the weld and thus significant compressive plastic deformation is caused locally, and this leads to extremely high tensile stress after release of the electrodes. Therefore, it is important to appropriately adjust the holding time in accordance with the magnitude of the electrode angle.

Specifically, when the electrode angle is greater than or equal to 0 degrees to less than 1 degree, the bending stress applied to the weld due to the electrode angle is relatively small. As a result, the tensile stress generated in the weld after release of the electrodes is not significantly high. Thus, the amount of increase of the holding time with respect to the electrode angle may be small.

When the electrode angle is greater than or equal to 1 degree to less than 10 degrees, the amount of increase in the tensile stress generated in the weld after release of the electrodes becomes noticeable as the electrode angle increases. Thus, it is necessary to increase the holding time in accordance with the amount of increase in the tensile stress.

As used herein, the electrode angle of 1 degree means substantially 1.0 degree.

When the electrode angle is greater than or equal to 10 degrees to less than 20 degrees, the tensile stress that is generated in the weld is very high. However, the electrodes are not released before the temporarily molten metal coating completely solidifies, and this prevents the occurrence of cracking. It is assumed that when there is no remaining molten metal coating, cracking will not occur. When the electrode angle is greater than or equal to 10 degrees to less than 20 degrees, a holding time sufficient for the molten metal coating to solidify is provided and, therefore, the amount of increase of the holding time with respect to the electrode angle may be small. However, when the electrode angle is large, the area of contact between the electrode and the steel sheet is small in general and, therefore, the cooling rate of the weld tends to decrease. Accordingly, it is desirable to increase the holding time by an amount greater than or equal to a predetermined amount in accordance with the electrode angle. An electrode angle of 20 degrees or more is not employable in practice.

The foregoing description describes the relationship between the electrode angle and the holding time with respect to cracking occurring during or after welding. In the following, other influential factors associated with cracking that occurs during or after welding will also be described.

When a steel sheet to be welded has a large sheet thickness t, sufficient heat removal to the electrode cannot be accomplished. This results in a decreased cooling rate of the weld and high restraint of the weld. As a result, the probability of cracking increases.

Similarly, when a steel sheet to be welded has a high tensile strength T, high restraint of the weld occurs and a high tensile stress is generated in the weld after release of the electrodes. As a result, the probability of cracking increases.

When the electrode force F of the electrode is large, discharge of the molten metal coating to areas around the weld is facilitated. As a result, in the proximity of the weld, the amount of the metal coating in contact with the base material decreases, which inhibits the occurrence of cracking.

Furthermore, in particular, when the electrode angle A is large, the area of contact between the electrode and the steel sheet, in general, increases with the increase in the electrode force F. Thus, the cooling rate of the weld increases. As a result, the occurrence of cracking is inhibited.

The above formulas have been found in consideration of these factors. The coefficients in the formulas are optimal coefficients determined by experiment in accordance with the electrode angle.

Furthermore, to reduce cracking when the sheet combination has a high probability of cracking or when welding is performed in a state in which the restraint of the weld is high, it is preferable that the following relationships be satisfied, $3 \cdot A \cdot (t \cdot T/F)^{1/2} \leq H$ when $0 \leq A < 1$ $(8 \cdot A - 5) \cdot (t \cdot T/F)^{1/2} \leq H$ when $1 \leq A < 10$ $(A + 65) \cdot (t \cdot T/F)^{1/2} \leq H$ when $10 \leq A < 20$.

Further desirably, it is preferable that the following relationships be satisfied, $6 \cdot A \cdot (t \cdot T/F)^{1/2} \leq H$ when $0 \leq A < 1$ $(12 \cdot A - 6) \cdot (t \cdot T/F)^{1/2} \leq H$ when $1 \leq A < 10$ $(A + 104) \cdot (t \cdot T/F)^{1/2} \leq H$ when $10 \leq A < 20$.

Furthermore, when the electrode angle A is specifically recited as being greater than or equal to 0.2 in the above formulas, it is preferable that the following relationships be satisfied to reduce cracking when the sheet combination has a high probability of cracking or when welding is performed in a state in which the restraint of the weld is high, $3 \cdot A \cdot (t \cdot T/F)^{1/2} \leq H$ when $0.2 \leq A < 1$ $(8 \cdot A - 5) \cdot (t \cdot T/F)^{1/2} \leq H$ when $1 \leq A < 10$ $(A + 65) \cdot (t \cdot T/F)^{1/2} \leq H$ when $10 \leq A < 20$.

Further desirably, it is more preferable that the following relationships be satisfied, $6 \cdot A \cdot (t \cdot T/F)^{1/2} \leq H$ when $0.2 \leq A < 1$ $(12 \cdot A - 6) \cdot (t \cdot T/F)^{1/2} \leq H$ when $1 \leq A < 10$ $(A + 104) \cdot (t \cdot T/F)^{1/2} \leq H$ when $10 \leq A < 20$.

Figure 3:
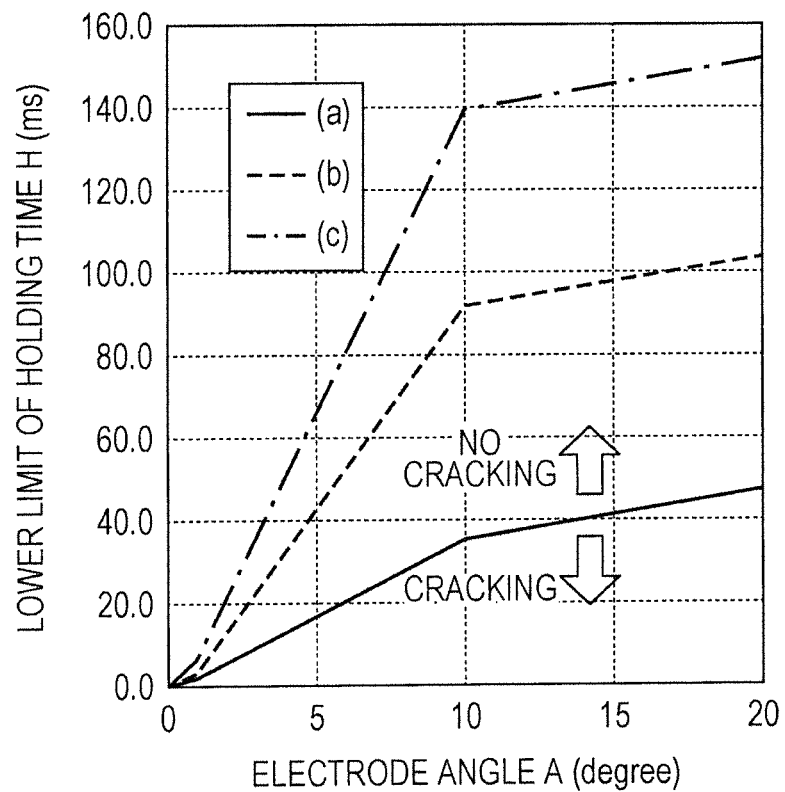
FIG. 3 is a conceptual diagram illustrating formulas satisfied by our resistance spot welding method.

FIG. 3 is a conceptual diagram illustrating the formulas satisfied ((a) in FIG. 3), the formulas preferably satisfied ((b) in FIG. 3), and the formulas more preferably satisfied ((c) in FIG. 3) by our above-described resistance spot welding method. FIG. 3 is a diagram illustrating when, in the formulas, the sheet thickness t is 2.5 mm, the tensile strength T is 1500 MPa, and the electrode force F is 2500 N.

Thus, the holding time is set to be greater than or equal to a predetermined length in accordance with the electrode angle A and, as a result, cracking is inhibited. However, an excessive increase in the cooling rate can decrease the toughness of the nugget and, therefore, it is desirable that the upper limit of the holding time H be 2000 ms.

The tensile strength T of the steel sheet is not particularly limited and, for example, may be 250 MPa to 2000 MPa. However, as described above, the probability of cracking increases when the tensile strength of the sheet combination is high. Thus, to provide an enhanced effect, our method may be applied to a sheet combination of steel sheets at least one of which has a tensile strength greater than or equal to 590 MPa. In particular, when at least one of the steel sheets of the sheet combination has a tensile strength greater than or equal to 780 MPa, a more enhanced effect is achieved.

Figure 4:
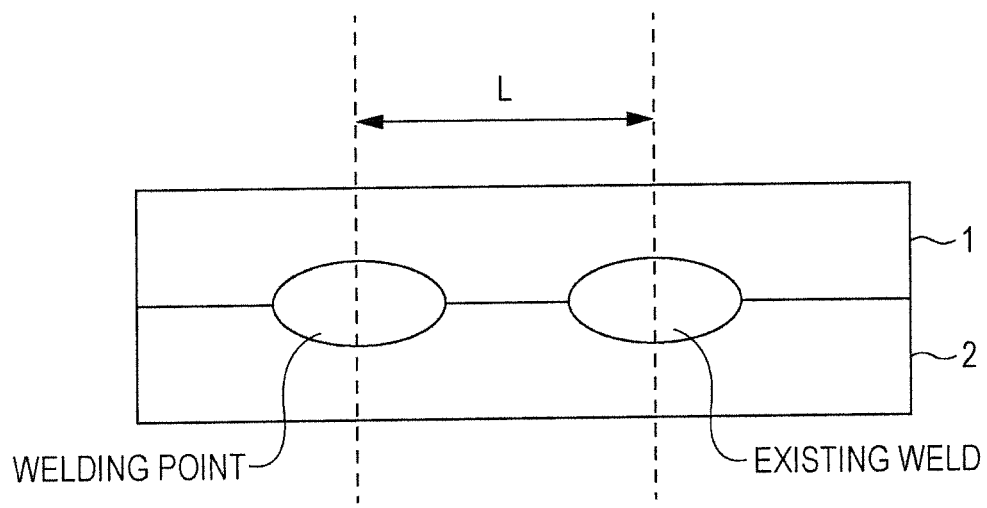
FIG. 4 is a diagram illustrating a distance between a center of a welding point and a center of an existing weld.

When there is an existing weld near a welding point to which welding is applied, deformation of the steel sheets is restricted by the existing weld and thus the welding is performed under very high restraint. This results in generation of a high tensile stress in the weld, which increases the probability of cracking. Thus, as illustrated in FIG. 4, when there are one or more existing welds around a welding point, a center-to-center distance L may be set to greater than or equal to 6.0 mm so that the effect of inhibiting the occurrence of cracking in the weld can be further enhanced. The center-to-center distance L is defined as a distance between a center of the welding point and a center of the existing weld closest to the welding point. The center of the welding point refers to the center of the nugget at the faying surfaces of the welded steel sheets. The shape of the nugget at the faying surfaces of the welded steel sheets is circular when the electrode angle A is 0, and ellipsoid when the electrode angle A>0 with the center of the ellipsoid being the intersection point of the major and minor axes. When the shape is other than circular or ellipsoid, the center-to-center distance L is determined by designating, as the center, the center of gravity of the shape at the faying surfaces.

When, for example, a sheet combination has a higher probability of cracking or the electrode angle A is large, it is preferable that the center-to-center distance L be greater than or equal to 8.0 mm. Further desirably, it is more preferable that the center-to-center distance L be greater than or equal to 10.0 mm.

The steel grades of the steel sheets of the sheet combination are not particularly limited. The steel sheets may be produced by any method using, for example, cold rolling or hot rolling and, also, the steel sheets may be of any microstructure. The steel sheets of the sheet combination may be hot pressed steel sheets, of course. Furthermore, the sheet thicknesses of the steel sheets may be any thicknesses provided that they are within a range (approximately 0.5 to 4.0 mm) that can be used for typical automobile bodies.

The metal coating layer of the surface-treated steel sheet including the metal coating layer may also have any composition. As described above, one cause of the cracking in the weld is melting of the metal coating layer, which has a low melting point. Thus, the effect of inhibiting cracking in the weld is enhanced when the coating layer has a melting point lower than that of the base material. The melting point of the base material (base steel sheet) ranges from 1400 to 1570° C., for example, and the melting point of the metal coating layer ranges from 300 to 1200° C., for example. The melting points of typical coating layers are lower than those of steel sheets. Examples of the metal coating layers include Zn-based coating layers and Al-based coating layers. For parts that require good corrosion resistance, Zn-based coatings are better than Al-based coatings. This is because the sacrificial corrosion protection by Zn, zinc, reduces the corrosion rate of the base steel sheet. Examples of the Zn-based coatings include typical coatings such as galvanized (GI), galvannealed (GA), electrogalvanized (EG), Zn—Ni-based (e.g., a Zn—Ni-based coating containing 10 to 25 mass % Ni), Zn—Al-based, Zn—Mg-based, and Zn—Al—Mg-based. Examples of the Al-based coatings include Al—Si-based coatings (e.g., an Al—Si-based coating containing 10 to 20 mass % Si). The coating weight of the coating is also not limited, but when weldability is to be taken into account, it is desirable that the coating weight be less than or equal to 120 g/m$^2$ per side.

The sheet combination is not particularly limited, and may be a combination of two or more overlapping steel sheets of the same grade or a combination of two or more overlapping steel sheets of different grades. The steel sheets may have different sheet thicknesses, of course. The combination may be a combination of a steel sheet including a metal coating layer having a melting point lower than that of the steel sheet and a steel sheet not including a metal coating layer.

Furthermore, the current, welding time, and electrode force during current passage may be constant or may not be constant. The current and/or the electrode force may be varied in two or more steps. Between the steps, a cooling time may be provided. Furthermore, it is of course possible to employ a controlling method that monitors parameters such as the resistance and voltage during welding and changes the current and/or the welding time in accordance with the variations.

The following describes preferred ranges of the current, the welding time, and the electrode force during current passage in the case where welding is performed by one-step current passage. The current during current passage is preferably less than or equal to 10 kA, for example. The welding time is preferably 200 ms to 700 ms, for example. The electrode force during current passage preferably is 2000 N to 7000 N, for example.

In multi-step current passage, in which previous and subsequent currents in short time are applied before and after the main current, the upper limit of the preferred current can be extended to 15 kA. Also, the upper limit of the preferred welding time can be extended to 1000 ms. The welding time in multi-step current passage is the total of the welding times of all the steps.

Use of the above-described resistance spot welding method enables production of a welded member formed of two or more welded steel sheets at least one of which is a surface-treated steel sheet including a metal coating layer. Specifically, the welded member production method is a welded member production method including a step of providing a sheet combination by arranging two or more steel sheets to overlap each other, at least one of the steel sheets being a surface-treated steel sheet including a metal coating layer, and a step of welding the provided sheet combination by the resistance spot welding described above. When welding is performed using the resistance spot welding method described above, the occurrence of cracking in the weld is inhibited, and as a result, a welded member having a weld with reduced cracking is produced.

EXAMPLES

Figure 5:
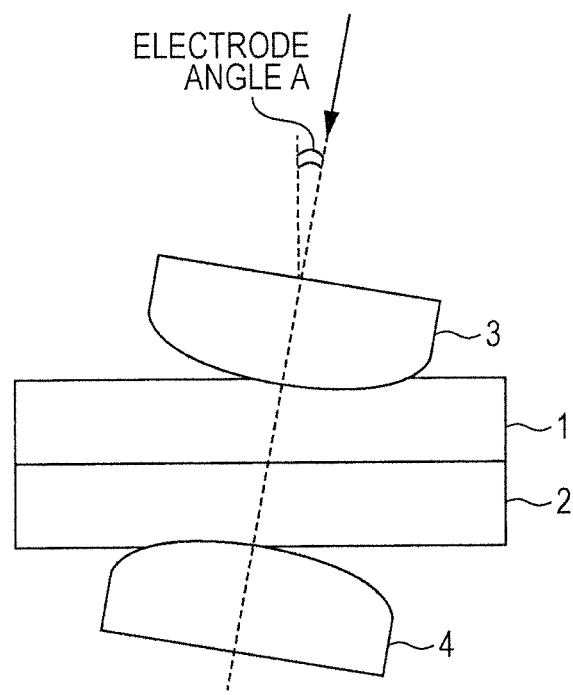
FIG. 5 is a diagram illustrating a test method in examples in using a sheet combination of two overlapping sheets.

The following describes examples according to our methods. Resistance spot welding was performed on sheet combinations, each of which included two or three overlapping sheets, to form joints to produce welded members. The sheet combinations are shown in Table 1, and the conditions used are shown in Table 2-1 and Table 2-2. In the specimens of this example, the melting point of the base material ranges from 1400 to 1570° C., the melting point of the galvanized coating (GI) ranges from 400 to 500° C., and the melting point of the galvannealed coating (GA) ranges from 600 to 950° C. The tensile strengths shown in Table 1 are tensile strengths determined in the following manner. From each of the steel sheets, a JIS No. 5 tensile test specimen was taken in a direction parallel to the rolling direction, and a tensile test was conducted in accordance with JIS Z 2241: 2011. In Table 2, the electrode forces F in the step of retaining the electrode force after completion of current passage are measured values. FIG. 5 illustrates a test method when the sheet combination was made up of two overlapping steel sheets 1 and 2. FIG. 6 illustrates a test method when the sheet combination was made up of three overlapping steel sheets 1, 2, and 6. In Table 2-1 and Table 2-2, "No" in the column "existing weld" indicates that there was no existing weld around the welding point to be evaluated. When there was an existing weld, the distance L between the center of the welding point and the center of the existing weld is shown in the column "existing weld" in Table 2-1 and Table 2-2. The welding conditions for the weld to be evaluated were the same as those for the existing weld.

The welder used was an inverter DC resistance spot welder, and the electrodes used were chromium copper electrodes of DR-type and 6 mm in tip diameter. The current passage was performed once and the current (welding current) during the current passage was constant. The electrode angle was the electrode angle at the start of the current passage. The electrode force was the electrode force at the completion of the current passage, and was constant during the current passage and throughout the process of retaining the electrode force at the completion of the current passage. Furthermore, the resistance spot welding was performed at room temperature, and was performed with the electrodes being water cooled constantly.

In each of the obtained joints, the weld was cut in the sheet thickness direction of the steel sheets, and the cross section was mirror polished to be examined for the presence or absence of cracks using a scanning electron microscope (at a magnification of 2000 times). Ten joints were produced and examined under the same conditions, and the results were determined based on the following criteria. A to C were evaluations of ○ (pass) and F was an evaluation of ×(fail).
A: All the ten joints were free of cracks.
B: Among the ten joints, one joint had a crack less than 10 μm in length, and all the ten joints were free of cracks greater than or equal to 10 μm in length.

C: Among the ten joints, two joints had a crack less than 10 μm in length, and all the ten joints were free of cracks greater than or equal to 10 μm in length.

F: Among the ten joints, three or more joints had a crack less than 10 μm in length, or among the ten joints, one or more joints had a crack greater than or equal to 10 μm in length.

The joints produced by setting a holding time that satisfies the examples were all evaluated as one of A to C (○) regardless of the presence or absence of splashing.

TABLE 1

| Sheet combination No. | Steel sheet 1 | | | Steel sheet 2 | | | Steel sheet 6 | | |
|---|---|---|---|---|---|---|---|---|---|
| | Sheet thickness (mm) | Tensile strength (MPa) | Coating type | Sheet thickness (mm) | Tensile strength (MPa) | Coating type | Sheet thickness (mm) | Tensile strength (MPa) | Coating type |
| A | 1.6 | 980 | Galvannealed (GA) | 1.6 | 980 | Galvannealed (GA) | | | |
| B | 1.6 | 980 | Galvanized (GI) | 1.6 | 980 | Galvanized (GI) | | | |
| C | 1.6 | 980 | Galvannealed (GA) | 1.4 | 270 | No coating | | | |
| D | 1.4 | 980 | Galvannealed (GA) | 1.6 | 980 | Galvannealed (GA) | 1.4 | 980 | No coating |
| E | 1.0 | 980 | Galvanized (GI) | 1.0 | 980 | Galvanized (GI) | | | |
| F | 1.0 | 980 | No coating | 1.0 | 980 | Galvannealed (GA) | 1.0 | 590 | No coating |
| G | 1.8 | 1180 | Galvannealed (GA) | 1.8 | 1180 | Galvannealed (GA) | | | |
| H | 1.8 | 1470 | No coating | 1.8 | 980 | Galvannealed (GA) | | | |
| I | 2.0 | 980 | Galvannealed (GA) | 2.0 | 980 | Galvannealed (GA) | | | |
| J | 1.6 | 980 | Galvanized (GI) | 1.0 | 270 | Galvannealed (GA) | | | |
| K | 2.0 | 980 | Galvannealed (GA) | 1.0 | 270 | Galvannealed (GA) | | | |
| L | 1.8 | 1180 | Galvannealed (GA) | 1.0 | 270 | No coating | | | |
| M | 1.8 | 1180 | Galvanized (GI) | 1.0 | 270 | No coating | | | |
| N | 1.6 | 1470 | Galvanized (GI) | 1.2 | 270 | Galvannealed (GA) | | | |
| O | 1.6 | 980 | Galvannealed (GA) | 1.6 | 1470 | Galvannealed (GA) | 1.0 | 270 | Galvannealed (GA) |
| P | 1.6 | 1180 | Galvannealed (GA) | 2.0 | 1180 | Galvannealed (GA) | 1.2 | 270 | Galvannealed (GA) |
| Q | 1.6 | 1180 | Galvanized (GI) | 1.8 | 1180 | No coating | 1.2 | 270 | Galvannealed (GA) |
| R | 1.2 | 1180 | Galvanized (GI) | 1.4 | 270 | Galvanized (GI) | | | |
| S | 2.0 | 980 | Galvanized (GI) | 2.2 | 1180 | Galvanized (GI) | 2.0 | 1180 | Galvanized (GI) |
| T | 2.2 | 1180 | Galvanized (GI) | 1.0 | 270 | Galvanized (GI) | | | |

TABLE 2-1

| Condition No. | Sheet combination No. | Electrode angle (degree) | Applied formula | Electrode force (N) | Welding current (kA) | Welding time (ms) | Result of applied formula | Holding time (ms) | Cracking evaluation | Existing weld | |
|---|---|---|---|---|---|---|---|---|---|---|---|
| 1 | A | 0 | $2 \cdot A \cdot (t \cdot T/F)^{1/2}$ | 3500 | 6.0 | 320 | 0.00 | 10 | ○ (A) | No | Example |
| 2 | A | 0.5 | $2 \cdot A \cdot (t \cdot T/F)^{1/2}$ | 3500 | 6.0 | 320 | 0.67 | 10 | ○ (A) | No | Example |
| 3 | A | 5 | $(3 \cdot A - 1) \cdot (t \cdot T/F)^{1/2}$ | 3500 | 6.0 | 320 | 9.37 | 80 | ○ (A) | No | Example |
| 4 | A | 12 | $(A + 19) \cdot (t \cdot T/F)^{1/2}$ | 3500 | 6.0 | 320 | 20.75 | 100 | ○ (A) | No | Example |
| 5 | B | 1 | $(3 \cdot A - 1) \cdot (t \cdot T/F)^{1/2}$ | 4000 | 6.5 | 320 | 1.25 | 20 | ○ (A) | No | Example |
| 6 | B | 3 | $(3 \cdot A - 1) \cdot (t \cdot T/F)^{1/2}$ | 4000 | 6.5 | 320 | 5.01 | 30 | ○ (A) | No | Example |
| 7 | C | 5 | $(3 \cdot A - 1) \cdot (t \cdot T/F)^{1/2}$ | 4000 | 7.0 | 300 | 8.77 | 40 | ○ (A) | No | Example |
| 8 | C | 15 | $(A + 19) \cdot (t \cdot T/F)^{1/2}$ | 4000 | 7.0 | 300 | 21.29 | 200 | ○ (A) | No | Example |
| 9 | D | 5 | $(3 \cdot A - 1) \cdot (t \cdot T/F)^{1/2}$ | 5000 | 6.0 | 420 | 7.84 | 200 | ○ (A) | No | Example |
| 10 | E | 1 | $(3 \cdot A - 1) \cdot (t \cdot T/F)^{1/2}$ | 3500 | 6.0 | 220 | 1.06 | 10 | ○ (A) | No | Example |
| 11 | E | 5 | $(3 \cdot A - 1) \cdot (t \cdot T/F)^{1/2}$ | 3500 | 6.0 | 220 | 7.41 | 30 | ○ (A) | No | Example |
| 12 | F | 3 | $(3 \cdot A - 1) \cdot (t \cdot T/F)^{1/2}$ | 3500 | 5.5 | 300 | 4.23 | 40 | ○ (A) | No | Example |
| 13 | F | 5 | $(3 \cdot A - 1) \cdot (t \cdot T/F)^{1/2}$ | 4000 | 5.5 | 300 | 6.93 | 80 | ○ (A) | No | Example |
| 14 | G | 3 | $(3 \cdot A - 1) \cdot (t \cdot T/F)^{1/2}$ | 5000 | 6.0 | 320 | 5.21 | 100 | ○ (A) | No | Example |
| 15 | G | 5 | $(3 \cdot A - 1) \cdot (t \cdot T/F)^{1/2}$ | 5000 | 6.0 | 320 | 9.12 | 160 | ○ (A) | No | Example |
| 16 | H | 0.5 | $2 \cdot A \cdot (t \cdot T/F)^{1/2}$ | 5000 | 6.0 | 360 | 0.73 | 20 | ○ (A) | No | Example |
| 17 | H | 3 | $(3 \cdot A - 1) \cdot (t \cdot T/F)^{1/2}$ | 5000 | 6.0 | 360 | 5.82 | 100 | ○ (A) | No | Example |
| 18 | I | 0 | $2 \cdot A \cdot (t \cdot T/F)^{1/2}$ | 4500 | 6.5 | 400 | 0.00 | 10 | ○ (A) | No | Example |
| 19 | I | 3 | $(3 \cdot A - 1) \cdot (t \cdot T/F)^{1/2}$ | 4500 | 6.5 | 400 | 5.28 | 140 | ○ (A) | No | Example |
| 20 | J | 0.5 | $2 \cdot A \cdot (t \cdot T/F)^{1/2}$ | 5000 | 8 | 280 | 0.56 | 20 | ○ (A) | No | Example |
| 21 | J | 5 | $(3 \cdot A - 1) \cdot (t \cdot T/F)^{1/2}$ | 5000 | 7.5 | 280 | 7.84 | 200 | ○ (A) | No | Example |
| 22 | J | 12 | $(A + 19) \cdot (t \cdot T/F)^{1/2}$ | 5000 | 8 | 280 | 17.36 | 240 | ○ (A) | No | Example |
| 23 | K | 1 | $(3 \cdot A - 1) \cdot (t \cdot T/F)^{1/2}$ | 5500 | 8.5 | 340 | 1.19 | 40 | ○ (A) | No | Example |
| 24 | K | 3 | $(3 \cdot A - 1) \cdot (t \cdot T/F)^{1/2}$ | 5500 | 8 | 340 | 4.78 | 100 | ○ (A) | No | Example |
| 25 | L | 0.5 | $2 \cdot A \cdot (t \cdot T/F)^{1/2}$ | 5500 | 9 | 320 | 0.62 | 20 | ○ (A) | No | Example |
| 26 | L | 3 | $(3 \cdot A - 1) \cdot (t \cdot T/F)^{1/2}$ | 5500 | 8.5 | 320 | 4.97 | 60 | ○ (A) | No | Example |
| 27 | M | 0.5 | $2 \cdot A \cdot (t \cdot T/F)^{1/2}$ | 5500 | 9 | 320 | 0.62 | 20 | ○ (A) | No | Example |
| 28 | M | 3 | $(3 \cdot A - 1) \cdot (t \cdot T/F)^{1/2}$ | 5500 | 8.5 | 320 | 4.97 | 80 | ○ (A) | No | Example |
| 29 | N | 1 | $(3 \cdot A - 1) \cdot (t \cdot T/F)^{1/2}$ | 5500 | 7.5 | 340 | 1.31 | 10 | ○ (A) | No | Example |
| 30 | N | 5 | $(3 \cdot A - 1) \cdot (t \cdot T/F)^{1/2}$ | 5500 | 7.5 | 340 | 9.16 | 60 | ○ (A) | No | Example |
| 31 | N | 12 | $(A + 19) \cdot (t \cdot T/F)^{1/2}$ | 5500 | 7.5 | 340 | 20.27 | 200 | ○ (A) | No | Example |

TABLE 2-1-continued

| Condition No. | Sheet combination No. | Electrode angle (degree) | Applied formula | Electrode force (N) | Welding current (kA) | Welding time (ms) | Result of applied formula | Holding time (ms) | Cracking evaluation | Existing weld | |
|---|---|---|---|---|---|---|---|---|---|---|---|
| 32 | O | 1 | $(3 \cdot A - 1) \cdot (t \cdot T/F)^{1/2}$ | 6000 | 7 | 400 | 1.25 | 20 | ○ (A) | No | Example |
| 33 | O | 3 | $(3 \cdot A - 1) \cdot (t \cdot T/F)^{1/2}$ | 6000 | 6.5 | 400 | 5.01 | 60 | ○ (A) | No | Example |

TABLE 2-2

| Condition No. | Sheet combination No. | Electrode angle (degree) | Applied formula | Electrode force (N) | Welding current (kA) | Welding time (ms) | Result of applied formula | Holding time (ms) | Cracking evaluation | Existing weld | |
|---|---|---|---|---|---|---|---|---|---|---|---|
| 34 | P | 1 | $(3 \cdot A - 1) \cdot (t \cdot T/F)^{1/2}$ | 6500 | 7 | 420 | 1.21 | 20 | ○ (A) | No | Example |
| 35 | P | 5 | $(3 \cdot A - 1) \cdot (t \cdot T/F)^{1/2}$ | 6500 | 7 | 420 | 8.44 | 120 | ○ (A) | No | Example |
| 36 | Q | 0.5 | $2 \cdot A \cdot (t \cdot T/F)^{1/2}$ | 5500 | 6.5 | 400 | 0.62 | 20 | ○ (A) | No | Example |
| 37 | Q | 5 | $(3 \cdot A - 1) \cdot (t \cdot T/F)^{1/2}$ | 5500 | 7 | 400 | 8.70 | 200 | ○ (A) | No | Example |
| 38 | R | 3 | $(3 \cdot A - 1) \cdot (t \cdot T/F)^{1/2}$ | 6000 | 7 | 300 | 4.20 | 40 | ○ (A) | No | Example |
| 39 | R | 13 | $(A + 19) \cdot (t \cdot T/F)^{1/2}$ | 6000 | 6 | 300 | 16.79 | 220 | ○ (A) | No | Example |
| 40 | A | 5 | $(3 \cdot A - 1) \cdot (t \cdot T/F)^{1/2}$ | 3500 | 5.0 | 320 | 9.37 | 5 | X (F) | No | Comparative Example |
| 41 | A | 10 | $(A + 19) \cdot (t \cdot T/F)^{1/2}$ | 3500 | 5.0 | 320 | 19.41 | 10 | X (F) | No | Comparative Example |
| 42 | B | 8 | $(3 \cdot A - 1) \cdot (t \cdot T/F)^{1/2}$ | 4000 | 6.5 | 320 | 14.40 | 10 | X (F) | No | Comparative Example |
| 43 | D | 5 | $(3 \cdot A - 1) \cdot (t \cdot T/F)^{1/2}$ | 5000 | 6.0 | 420 | 7.84 | 5 | X (F) | No | Comparative Example |
| 44 | G | 10 | $(A + 19) \cdot (t \cdot T/F)^{1/2}$ | 5000 | 6.0 | 320 | 18.90 | 10 | X (F) | No | Comparative Example |
| 45 | I | 15 | $(A + 19) \cdot (t \cdot T/F)^{1/2}$ | 4500 | 6.5 | 400 | 22.44 | 20 | X (F) | No | Comparative Example |
| 46 | N | 5 | $(3 \cdot A - 1) \cdot (t \cdot T/F)^{1/2}$ | 4000 | 6.0 | 300 | 10.74 | 10 | X (F) | No | Comparative Example |
| 47 | O | 5 | $(3 \cdot A - 1) \cdot (t \cdot T/F)^{1/2}$ | 4000 | 6.5 | 440 | 10.74 | 10 | X (F) | No | Comparative Example |
| 48 | O | 12 | $(A + 19) \cdot (t \cdot T/F)^{1/2}$ | 4000 | 6.5 | 440 | 23.77 | 20 | X (F) | No | Comparative Example |
| 49 | P | 8 | $(3 \cdot A - 1) \cdot (t \cdot T/F)^{1/2}$ | 3500 | 5.5 | 440 | 18.89 | 10 | X (F) | No | Comparative Example |
| 50 | A | 0.2 | $2 \cdot A \cdot (t \cdot T/F)^{1/2}$ | 3500 | 6.0 | 320 | 0.27 | 10 | ○ (A) | No | Example |
| 51 | I | 0.2 | $2 \cdot A \cdot (t \cdot T/F)^{1/2}$ | 4500 | 6.5 | 400 | 0.26 | 10 | ○ (A) | No | Example |
| 52 | S | 4 | $(3 \cdot A - 1) \cdot (t \cdot T/F)^{1/2}$ | 5000 | 6.5 | 420 | 7.93 | 20 | ○ (B) | No | Example |
| 53 | S | 13 | $(A + 19) \cdot (t \cdot T/F)^{1/2}$ | 5000 | 6.5 | 420 | 23.06 | 60 | ○ (B) | No | Example |
| 54 | T | 8 | $(3 \cdot A - 1) \cdot (t \cdot T/F)^{1/2}$ | 4000 | 7.5 | 400 | 18.53 | 50 | ○ (B) | No | Example |
| 55 | S | 7 | $(3 \cdot A - 1) \cdot (t \cdot T/F)^{1/2}$ | 5000 | 6.5 | 420 | 14.41 | 20 | ○ (C) | No | Example |
| 56 | T | 5 | $(3 \cdot A - 1) \cdot (t \cdot T/F)^{1/2}$ | 4000 | 7.5 | 400 | 11.28 | 20 | ○ (C) | No | Example |
| 57 | A | 5 | $(3 \cdot A - 1) \cdot (t \cdot T/F)^{1/2}$ | 3500 | 6.0 | 320 | 9.37 | 80 | ○ (A) | Yes: L = 15 mm | Example |
| 58 | E | 5 | $(3 \cdot A - 1) \cdot (t \cdot T/F)^{1/2}$ | 3500 | 7.0 | 220 | 7.41 | 30 | ○ (A) | Yes: L = 8 mm | Example |
| 59 | S | 4 | $(3 \cdot A - 1) \cdot (t \cdot T/F)^{1/2}$ | 5000 | 6.0 | 440 | 7.93 | 40 | ○ (B) | Yes: L = 5.5 mm | Example |

The invention claimed is:

1. A resistance spot welding method that joins together two or more overlapping steel sheets of a sheet combination, the method comprising:

squeezing the sheet combination between a pair of electrodes, passing a current through the sheet combination while applying an electrode force thereto using the pair of electrodes, retaining the electrode force after passing the current through the sheet combination for an electrode force retaining time that is determined by:

$2 \cdot A \cdot (t \cdot T/F)^{1/2} \leq H$ when $0 \leq A < 1$ $(3 \cdot A - 1) \cdot (t \cdot T/F)^{1/2} \leq H$ when $1 \leq A < 10$ $(A + 19) \cdot (t \cdot T/F)^{1/2} \leq H$ when $10 \leq A < 20$ where H (ms) is the electrode force retaining time after passing the current through the sheet combination, A (degrees) is an electrode angle of the electrodes, t (mm) is a sheet thickness of a steel sheet having a largest sheet thickness among the two or more steel sheets, T (MPa) is a tensile strength of a steel sheet having a highest tensile strength among the two or more steel sheets, and F (N) is the electrode force, and releasing the pair of electrodes from the sheet combination after the electrode force retaining time, wherein at least one of the two or more steel sheets is a surface-treated steel sheet including a metal coating layer.

2. The resistance spot welding method according to claim 1, wherein A is greater than or equal to 0.2.

3. The resistance spot welding method according to claim 1, wherein the metal coating layer is a Zn-based coating layer or an Al-based coating layer.

4. The resistance spot welding method according to claim 1, wherein at least one of the two or more steel sheets has a tensile strength greater than or equal to 590 MPa.

5. The resistance spot welding method according to claim 1, wherein, when there are one or more existing welds around a welding point, a distance L between a center of the welding point and a center of an existing weld closest to the welding point is set to greater than or equal to 6.0 mm to perform welding.

6. A resistance spot welding method that joins together two or more overlapping steel sheets of a sheet combination, the method comprising:
  squeezing the sheet combination between a pair of electrodes,
  passing a current through the sheet combination while applying an electrode force thereto using the pair of electrodes,
  retaining the electrode force after passing the current through the sheet combination for an electrode force retaining time that is determined by:

$2 \cdot A \cdot (t \cdot T/F)^{1/2} \leq H$ when $0 \leq A < 1$ $(3 \cdot A - 1) \cdot (t \cdot T/F)^{1/2} \leq H$ when $1 \leq A < 10$ $(A + 19) \cdot (t \cdot T/F)^{1/2} \leq H$ when $10 \leq A < 20$ where H (ms) is the electrode force retaining time after passing the current through the sheet combination, A (degrees) is an electrode angle of the electrodes, t (mm) is a sheet thickness of a steel sheet having a largest sheet thickness among the two or more steel sheets, T (MPa) is a tensile strength of a steel sheet having a highest tensile strength among the two or more steel sheets, and F (N) is the electrode force, and
  releasing the pair of electrodes from the sheet combination after the electrode force retaining time,
  wherein at least one of the two or more steel sheets is a surface-treated steel sheet including a metal coating layer, the metal coating layer having a melting point lower than a melting point of a base material of the surface-treated steel sheet.

7. The resistance spot welding method according to claim 6, wherein A is greater than or equal to 0.2.

8. The resistance spot welding method according to claim 6, wherein the metal coating layer is a Zn-based coating layer or an Al-based coating layer.

9. The resistance spot welding method according to claim 6, wherein at least one of the two or more steel sheets has a tensile strength greater than or equal to 590 MPa.

10. The resistance spot welding method according to claim 6, wherein, when there are one or more existing welds around a welding point, a distance L between a center of the welding point and a center of an existing weld closest to the welding point is set to greater than or equal to 6.0 mm to perform welding.

11. A method of producing a welded member comprising:
  providing a sheet combination by arranging two or more steel sheets to overlap each other, at least one of the steel sheets being a surface-treated steel sheet including a metal coating layer; and
  welding the provided sheet combination with the resistance spot welding method according to claim 1.

12. A method of producing a welded member comprising:
  providing a sheet combination by arranging two or more steel sheets to overlap each other, at least one of the steel sheets being a surface-treated steel sheet including a metal coating layer; and
  welding the provided sheet combination with the resistance spot welding method according to claim 6.

* * * * *